No. 731,527. PATENTED JUNE 23, 1903.
F. C. WAGNER.
WORM GEARING.
APPLICATION FILED SEPT. 20, 1901.
NO MODEL.

Witnesses.
Charles W. Wagner
George L. Moore

Inventor.
Frank C. Wagner

No. 731,527.

Patented June 23, 1903.

UNITED STATES PATENT OFFICE.

FRANK C. WAGNER, OF TERRE HAUTE, INDIANA.

WORM-GEARING.

SPECIFICATION forming part of Letters Patent No. 731,527, dated June 23, 1903.

Application filed September 20, 1901. Serial No. 76,002. (No model.)

*To all whom it may concern:*

Be it known that I, FRANK C. WAGNER, a citizen of the United States, residing at Terre Haute, in the county of Vigo and State of Indiana, have invented a new and useful Improvement in Worm-Gearing, which is fully set forth in the following specification and the accompanying drawings.

My invention relates to improvements in worm-gearing, and has for its object the diminution of the power wasted by friction in worm-gearing as ordinarily constructed.

It consists of novel means by which rolling contact is made between the worm and the worm-wheel instead of sliding contact.

To carry out my invention, I cut a channel in the contact-face of the worm-thread suitable for the reception and retaining of balls. Near each end of the worm-thread the ball-channel is carried inward toward the axis of the shaft and connected by a curved passage-way with a channel through the body of the worm, so that the balls, filling the channels and passage-ways, form a continuous chain, each ball traveling, when the gear is in motion, from one end of the worm-thread to the other, thence through one curved end passage-way, the channel through the body of the worm, and the other curved end passage-way to its starting-point. The teeth of the worm-wheel are in contact only with the balls, so that when relative motion takes place the friction between the worm and the worm-wheel is rolling friction, which is very much less than the sliding friction of ordinary worm-gearing. A similar combination of a helical channel with curved end passage-ways and a channel through the body of the worm may be constructed for the opposite face of the worm-thread, so that the gearing may be run either forward or backward at will.

I prefer to construct the entire worm and the teeth of the worm-wheel of tool-steel, or other metal which can be hardened, and to harden the same, so as to reduce wear to a minimum.

My invention further consists of novel details of construction, as hereinafter described and claimed.

Figure 1:
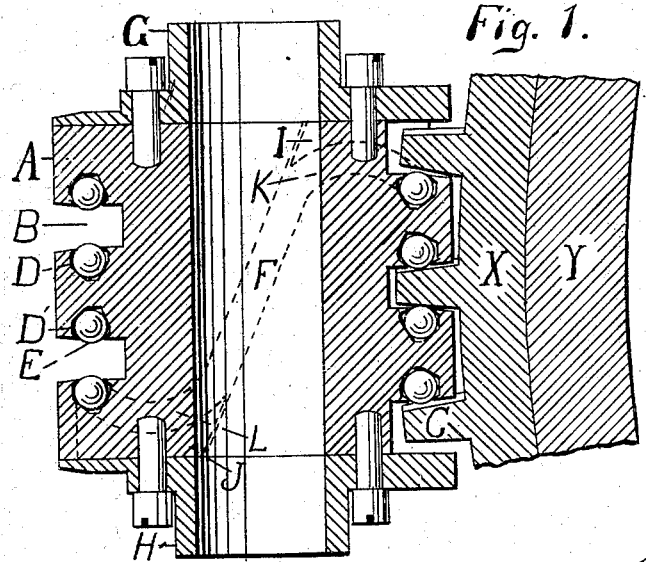
Figure 2:
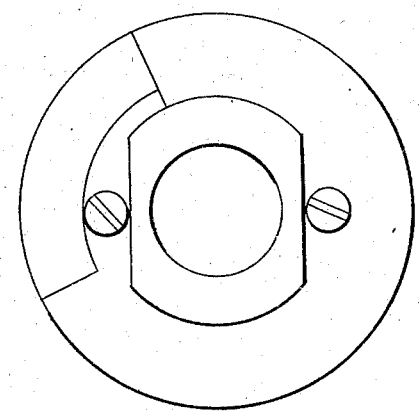
Figure 3:
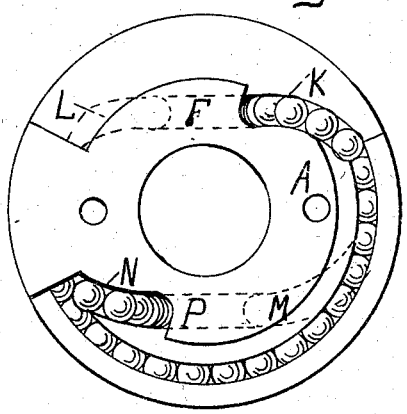
Figure 4:
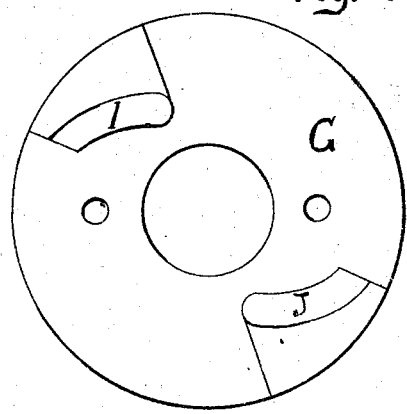
Figure 5:
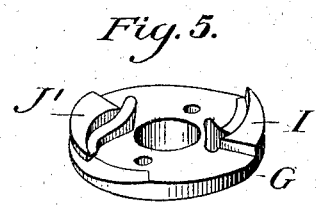

Figure 1 is a sectional view of a worm and portion of a worm-wheel embodying my invention. Fig. 2 represents a plan view of the worm. Fig. 3 represents a plan view of the central portion A of the worm. Fig. 4 shows the under side of end plate G. Fig. 5 is a perspective view of end plate G, showing the projections I and J.

Similar letters of reference apply to corresponding parts in the figures.

Referring to the drawings, A is the central portion of the worm, in which is cut the helical groove B, so shaped that the teeth of the worm-wheel do not touch any part of A.

D and D' are helical ball-channels in which balls E freely roll.

G and H are end plates removably fastened to A and containing projections I and J, which form walls for the curved end passage-ways K and L. (Shown dotted in Fig. 1.)

F (shown dotted in Figs. 1 and 3) is one of the ball-channels passing through the body of the worm and connecting at its two ends with the curved passage-ways K and L.

M, N, and P in Fig. 3 are the curved end passage-ways and the channel through the body of the worm, which connect with helical ball-channel D'.

Y is the cast-iron rim of the worm-wheel, upon which is forced the tool-steel ring X in which the worm-teeth are cut. By this construction the teeth may be hardened without danger of warping the wheel.

It will be seen, therefore, that by my invention the pressure is transmitted from the worm to the worm-wheel through balls which roll partly on the worm-wheel teeth and partly on the worm and that the balls form a continuous chain moving through a channel which has no abrupt changes of direction. By my invention also the gear works equally well forward and backward, and the balls for backward motion are entirely independent of those used for forward motion.

The shape and proportions of the different parts may be modified somewhat without departing from my real invention, and I do not, therefore, desire to be limited to the exact construction herein shown and described.

What I claim as my invention, and desire to secure by Letters Patent, is—

1. In a worm-gear, the combination of a central piece having a worm-thread containing a helical channel in the side thereof, also an endwise channel and curved grooves or partial channels connecting the helical channel with the endwise channel at corresponding ends, end pieces removably connected to said central piece and having parts projecting into recesses in said central piece to complete the curved end connecting-channels, and antifriction devices in said channels, all substantially as described.

2. In a worm-gear, the combination of a central piece having a worm-thread containing helical channels in the sides thereof, also endwise channels and curved grooves or partial channels connecting the helical channels with the endwise channels at corresponding ends, end pieces removably connected to said central piece and having parts projecting into recesses in said central piece to complete the curved end connecting-channels, and antifriction devices in said channels, all substantially as described.

FRANK C. WAGNER.

Witnesses:
CHARLES W. WAGNER,
GEORGE L. MOORE.